Feb. 17, 1942.     R. G. FISHEL     2,273,567
MULTIPLE SUBJECT AND MULTIPLE COLOR PICTURE
Filed April 4, 1938
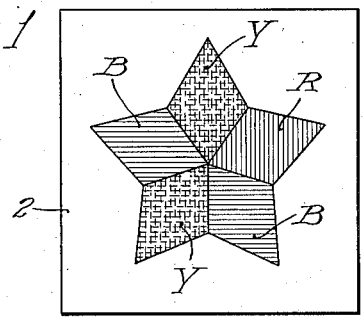
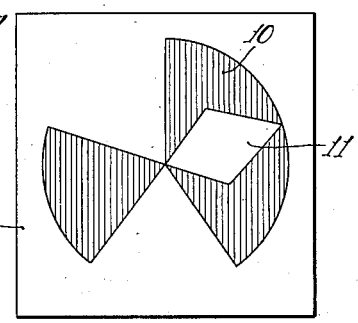
RED
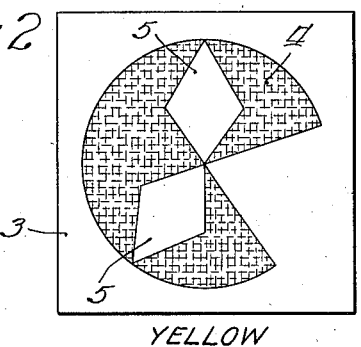
YELLOW
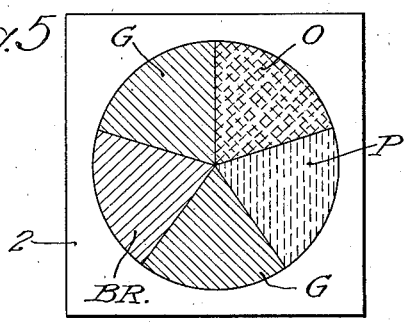
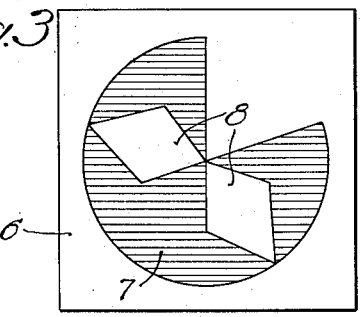
BLUE
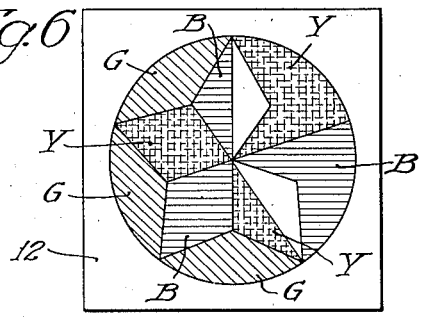
YELLOW & BLUE
Inventor:
Robert G. Fishel Patented Feb. 17, 1942

2,273,567

UNITED STATES PATENT OFFICE 2,273,567

MULTIPLE SUBJECT AND MULTIPLE COLOR PICTURE

Robert G. Fishel, Evanston, Ill., assignor of one-third to Frederick I. Eppey, Detroit, Mich., and one-third to Arthur H. Watson, Highland Park, Ill.

Application April 4, 1938, Serial No. 199,793

4 Claims. (Cl. 95—5.1)

My invention relates to improvements in multiple subject and multiple color pictures and method of making the same.

An object of the invention is to provide a print in one or more colors, presenting in itself a complete picture of a chosen subject, which print is so composed that upon the addition thereto of superimposed transparent films containing predetermined images, in one or more colors, such print may be transformed into a different multicolor picture of the same or a totally different subject.

Another object is to provide a print, as above described, wherein said print, with its self-contained complete picture portrayal, is so affected so long as said transparent film or films are superimposed thereupon as to completely extinguish all visibility of the picture of the print, even as to its most minute details, and wherein the said different, or final multicolor picture is possessed of a fineness of detail and full color composition governed only by the care and precision with which the original separate color plates of the said final multicolor picture are made.

A further object is to provide a simple and thoroughly practical method of making both the said print, with its self-contained picture and the images contained upon the said transparent films, from the subject chosen for portrayal in the said final multicolor picture.

Other objects, the advantages, and uses of the invention will become apparent after reading the following specification and claims and after consideration of the drawing forming a part of this specification, wherein:

Fig. 1 is a view of a multicolor print portraying a picture of a star with different colored points.

Figs. 2, 3, and 4 are views of transparent films having imprinted thereupon transparent yellow, blue and red images respectively, which films when superimposed upon the picture of the print of Fig. 1 transforms such picture to that of a full multicolor picture of a ball having different colored sections.

Fig. 5 is a view of the print of Fig. 1 transformed into the final multicolor picture of a ball by superimposing the films of Figs. 2, 3, and 4 thereupon; and Fig. 6 is a modified view of one of the transparent films illustrating the use of a plurality of the color images, for example, yellow and blue, on one film in connection with the subject of Figs. 1 to 5 inclusive.

I have selected for illustration herein, for the purpose of simplicity of disclosure, subjects for both initial print and final picture which are geometrical figures, each of which differs from the other both as to configuration and color. Such subjects as illustrated in the accompanying drawing might, for example, be used in connection with elementary study of color composition and to teach the use of the primary colors in color printing from separate color plates. It will be apparent however, as this specification progresses, that the picture of Fig. 1 may have been shown for example, as that of a winter landscape in one or more colors with plant life barren of foliage and that the picture of Fig. 5 may have been shown as a tropical scene, in full color with characteristic botanical luxuriance.

With reference to Fig. 1 the print illustrated therein may comprise a base 2 of white paperboard having printed thereupon in colors the picture of a star, the five points thereof being in colors, each point of a color different from that of the next adjacent point. The different colors used are identified by different reference letters, Y for yellow, B for blue, and R for red, as well as by appropriate cross-hatching.

It will be noted that the initial picture as contained in the print, Fig. 1, bears a definite relationship to the final picture as shown in Fig. 5, which relationship may be expressed as follows: The print, or initial picture may comprise only those color, or combinations of color, impressions that are included in physically corresponding portions of the final print. For example, the final picture of Fig. 5 is of a ball having portions colored green, orange, purple and brown, as indicated at G, O, P and Br respectively, and the portion of the ball that is orange includes therefore the yellow image of the uppermost point of the star of Fig. 1 and in addition red, which is added to the yellow image to make orange.

Referring now to Figs. 2, 3 and 4 wherein I have shown respectively three sheets of transparent film, such as Celluloid, identified by reference numerals 3, 6 and 9 respectively, each such sheet has imprinted thereon an image in one of the three primary or basic colors, of which the final picture of Fig. 5 is composed.

The film 3 has a yellow image 4 thereupon which represents as to relative shape and position, all of the yellow color impressions included in the final picture of Fig. 5 except that which is already available in the print of Fig. 1. The open spaces 5 indicate where such portion of the yellow color impression of the picture of Fig. 5 is found in the print of Fig. 1.

The film 6 has thereon a blue image 7 representing, as to relative shape and position, all of the blue color impressions included in the final picture except that found in the print of Fig. 1, the latter being omitted from the image 7 as indicated at 8.

The film 9 has thereon a red image 10 which like the images 4 and 7 represents as to its color all of the red color impressions of the final picture except that which is initially provided in the print of Fig. 1, the latter as indicated at 11.

With the parts above described, the transformation of the picture of Fig. 1, a multicolor print of a star having different colored points, to the final multicolor picture of a ball having different colored sections is carried out by superimposing the films 3, 6 and 9 each with their colored images thereupon over the print of Fig. 1, taking care that the image of each film is in register with the print and the remaining film images.

I have thus provided a print in multicolor presenting a picture of one subject which when subjected to the superimposing thereupon of films containing color images derived from the final picture transforms the print into the said final picture of a subject totally different from that of the picture of the print as to both picture portrayal and coloration. In the final picture all of the colors of the print picture and of the film images may be seen since in each event the inks used are transparent inks and the composite of all such colored images and their respective configuration produces the multicolor final image of the completed or final picture.

Where three basic or primary colors are used in preparing the print and film images the final picture may possess any coloration within the visible spectrum and therefore equal in color composition any picture which may be produced by color separation plates in the conventional manner.

One method of making the print of Fig. 1 is; after first having selected the subject of the final picture of Fig. 5, to make color separation plates of the final picture blocking out from each plate the portions of that plate which are not needed to make the subject of the initial print. These plates are used for printing the images upon the films 3, 6 and 9. The method of blocking out may be done by painting with opaque upon glass plates by the artist who composes the initial print picture, and by placing such glass plates in front of and in contact with the photo-emulsions of their respective color separation plates during exposure. After the above color separation plates are made, a reversal of the block-out opaque of the glass plates is made by photographic method upon other glass plates and the reversals so made used to make other color separation plates from which the picture of the initial print is imprinted upon the sheet 2. There is thus established a perfect relationship between the print picture, the film images and the final picture and automatic register of the divided image parts.

By the above method it will be apparent that it is not necessary that a certain area for example, in yellow on the initial print shall represent all of the yellow included in the corresponding area of the final picture, as has been illustrated in Figs. 1 to 5 inclusive, since the "blocking out" steps described may be done in hatch lines, or by light air brush in a manner such as to distribute the yellow of the said area between the initial print picture and the film upon which the yellow image is imprinted which added to the print will supply the required yellow color factor of the final picture.

If a permanent final picture is desired, the films 3, 6 and 9 may be self-sustaining decalcomania films initially disposed upon paper and adapted to be transferred while wet upon the print of sheet 2, and upon themselves thus to form a final picture composed of transparent film lamination each having its own color impressions in combination with the initial color impression of the print on sheet 2 as disclosed in my co-pending application Serial No. 170,733, filed October 25, 1937.

In Fig. 6 I have shown a modification of the transparent film image wherein there is combined on the film 12 both the yellow image Y and the blue image B, which when added to the yellow and blue color impressions of the initial picture supply the full yellow and blue components of the final picture. Note the overlapping areas of the blue and yellow images on the film 12 provide green as indicated at 6. In like manner, and if desired, the red, blue and yellow images of the three films 3, 6 and 9 may be combined on one film so that it alone when placed upon the print of Fig. 1 transforms the print picture to the final picture shown in Fig. 5.

Throughout this specification and the appended claims, the word "subject" is used to designate any particular and specific picture portrayal; for example a picture of a man standing would comprise a subject different from that of a picture of the same man in a sitting position, although generally the subject of the two pictures might be otherwise considered the same.

The words "transparent film" as used in this specification and appended claims denote any self-sustaining transparent film, whether it be a sheet of Celluloid, Cellophane or the transparent decalcomania film used in decalcomania transfers and intended for transfer from its initial support to a surface to be selected, such as the surface of said print or other similar films.

Having thus described my invention, what I claim as new and desire to secure by Letters Patent is:

1. In combination, means providing a multicolor print presenting a picture of one subject, and a plurality of transparent films superimposed upon the print one upon another, said film having imprinted thereon transparent images, each in a different color and of different configuration, said picture of said print and said images being so composed one relative to the others that when said films are placed over said print with their images in register with one another and with the picture of said print, a picture new in configuration is formed differing from said first named picture both as to coloration and subject.

2. In combination, a print presenting a multicolor picture of a predetermined subject, and a plurality of transparent films superimposed upon the print one upon another, each of said films having imprinted thereon a transparent image in at least one color and of different configuration than the picture of said print, said images being so composed relative to one another and to the multicolor picture of said print that when said films are superimposed upon one another and upon said print a picture in multicolor is formed that is totally different in color and configuration from the picture of said print and which picture includes the sum of all of the color impressions of said print picture and in addition all of the color impression of said transparent colored images.

3. The method of making multiple color and multiple image pictures which comprises selecting a chosen subject for the final multicolor picture, making primary color separation plates of said subject with portions of said plates blocked out in accordance with the requirements necessary to make a second picture of a subject different in configuration from said chosen subject upon combining in register the blocked out portions of said plates, in making a second set of color separation plates containing only those color portions of the chosen subject which were blocked out of said first set of color separation plates, in making a multicolor print from said second set of plates and in imprinting from said first set of plates in transparent colors the images thereof upon transparent lamina and superimposing a set of said lamina in register upon said print which was made from the second set of plates.

4. The method defined in claim 3, which includes imprinting upon each of said lamina one color image only from the corresponding of said first set of color separation plates.

ROBERT G. FISHEL.